(12) United States Patent
Ma

(10) Patent No.: US 11,372,162 B2
(45) Date of Patent: Jun. 28, 2022

(54) BEAM COMBINER FOR HIGH-POWER SIGNAL, AND MANUFACTURING METHOD FOR SAME

(71) Applicant: GZ PHOTONICS CO., LTD., Guangdong (CN)

(72) Inventor: Xiuquan Ma, Dongguan (CN)

(73) Assignee: GZ PHOTONICS CO., LTD.

( * ) Notice: Subject to any disclaimer, the term of this patent is extended or adjusted under 35 U.S.C. 154(b) by 0 days.

(21) Appl. No.: 17/284,681

(22) PCT Filed: Oct. 17, 2018

(86) PCT No.: PCT/CN2018/110567
§ 371 (c)(1),
(2) Date: Apr. 12, 2021

(87) PCT Pub. No.: WO2020/073348
PCT Pub. Date: Apr. 16, 2020

(65) Prior Publication Data
US 2021/0356671 A1    Nov. 18, 2021

(30) Foreign Application Priority Data
Oct. 12, 2018 (CN) .......................... 201811191745.5

(51) Int. Cl.
*G02B 6/04* (2006.01)
*G02B 6/245* (2006.01)
(Continued)

(52) U.S. Cl.
CPC ............. *G02B 6/2826* (2013.01); *G02B 6/04* (2013.01); *G02B 6/255* (2013.01); *G02B 6/2552* (2013.01);
(Continued)

(58) Field of Classification Search
CPC .......... G02B 6/04; G02B 6/245; G02B 6/255; G02B 6/2552; G02B 6/2555; G02B 6/26; G02B 6/2821; G02B 6/2826
See application file for complete search history.

(56) References Cited

U.S. PATENT DOCUMENTS 4,179,185 A * 12/1979 Hawk ................... G02B 6/2808
385/46
6,219,480 B1 * 4/2001 Cassarly .............. G02B 6/2804
385/39
(Continued)

FOREIGN PATENT DOCUMENTS

CN 1419657 A 5/2003
CN 102116902 A 7/2011
(Continued)

OTHER PUBLICATIONS

International Search Report dated Jun. 24, 2019 issued in corresponding Patent Application No. PCT/CN2018/110567 (4 pages).

*Primary Examiner* — Ryan A Lepisto
(74) *Attorney, Agent, or Firm* — Polsinelli PC

(57) ABSTRACT

A beam combiner includes: a plurality of input optical fibers, a beam combination optical fiber and an output optical fiber; the input optical fiber includes an input fiber core and an optical fiber input cladding layer wrapping an outer wall of the input fiber core, the output optical fiber includes an output fiber core and an optical fiber output cladding layer wrapping an outer wall of the output fiber core, a cross section of the optical fiber input cladding layer is fan-shaped or hexagonal and is provided with a groove and/or a protrusion along an axial direction, the plurality of input optical fibers are nested with each other to form the beam combination optical fiber, fiber cores in the beam combination optical fiber are all connected to the output fiber core, and a (Continued)

beam combination cladding layer of the beam combination optical fiber is connected to the output fiber core.

6 Claims, 16 Drawing Sheets

(51) Int. Cl.
  *G02B 6/255* (2006.01)
  *G02B 6/26* (2006.01)
  *G02B 6/28* (2006.01)
(52) U.S. Cl.
  CPC ......... *G02B 6/2555* (2013.01); *G02B 6/2821* (2013.01); *G02B 6/245* (2013.01); *G02B 6/26* (2013.01)

(56) References Cited

U.S. PATENT DOCUMENTS

| | | | | |
|---|---|---|---|---|
| 7,046,875 B2 * | 5/2006 | Gonthier | .................. | G02B 6/14 385/27 |
| 7,236,671 B2 * | 6/2007 | Rasmussen | ....... | H01S 3/094007 385/115 |
| 7,409,128 B2 * | 8/2008 | Holcomb | .......... | H01S 3/094003 385/115 |
| 7,455,464 B2 * | 11/2008 | Tammela | ............. | G02B 6/2835 385/95 |
| 7,532,792 B2 * | 5/2009 | Skovgaard | ......... | G02B 6/02376 385/24 |
| 7,559,706 B2 * | 7/2009 | Tammela | ............. | H01S 3/06754 385/95 |
| 8,085,464 B2 * | 12/2011 | Gonthier | ............. | H01S 3/06754 359/341.1 |
| 8,094,986 B2 * | 1/2012 | Tanaka | ................. | G02B 6/2835 359/341.1 |
| 8,515,220 B1 * | 8/2013 | Khitrov | ................ | G02B 6/2856 385/14 |
| 8,693,827 B2 * | 4/2014 | Katayama | ........... | G02B 6/0008 385/20 |
| 8,768,117 B2 * | 7/2014 | Seo | ..................... | H01S 3/06733 385/127 |
| 8,787,716 B2 * | 7/2014 | Kumkar | .............. | G02B 6/2856 385/15 |
| 8,903,211 B2 * | 12/2014 | Fini | ....................... | G02B 6/262 359/341.32 |
| 9,063,289 B1 * | 6/2015 | Farmer | ................. | H01S 5/4012 |
| 9,557,483 B2 * | 1/2017 | Kozak | .................. | G02B 6/2856 |
| 9,612,399 B2 * | 4/2017 | Noguchi | .............. | H01S 3/0071 |
| 9,759,866 B2 * | 9/2017 | Tanaka | ................. | H01S 5/4012 |
| 11,005,230 B2 * | 5/2021 | Sugiyama | ............ | H01S 3/2383 |
| 2006/0165358 A1 * | 7/2006 | Trebst | ................. | G02B 6/2835 385/115 |

FOREIGN PATENT DOCUMENTS

| CN | 102890312 A | 1/2013 |
|---|---|---|
| CN | 103472535 A | 12/2013 |

* cited by examiner

BEAM COMBINER FOR HIGH-POWER SIGNAL, AND MANUFACTURING METHOD FOR SAME

CROSS REFERENCE TO RELATED APPLICATION

This application is a National Phase of International Application No. PCT/CN2018/110567 filed on Oct. 17, 2018, entitled "BEAM COMBINER FOR HIGH-POWER SIGNAL, AND MANUFACTURING METHOD FOR SAME", which claims priority of Chinese Patent Application No. 201811191745.5 filed on Oct. 12, 2018, the contents of which are expressly incorporated by reference herein in their entireties.

TECHNICAL FIELD

The present disclosure relates to the field of fiber laser technology, particularly to a beam combiner for a high-power signal and a manufacturing method for the same.

BACKGROUND

A common method for manufacturing a signal beam combiner on the market includes a knotting method and a sleeve method. In the knotting method, multiple optical fibers are twisted into a beam through a multi-hole knotting tool, and the optical fiber beam is manufactured by fusing and tapering. In the optical fiber beam manufactured by this method, each optical fiber is in a rotationally twisted state, there is stress at the tapered area, and fiber breakage is easy to occur, and the twisting of the optical fiber easily causes mode excitation. In the sleeve method, multiple optical fibers are inserted into a quartz tube with an appropriate size, and the quartz tube is collapsed by fusing and tapering to bind various optical fibers into a beam. The above two methods inevitably require acid corrosion and tapering processes, the fusing and tapering manners reduce the fiber core and cause the quality of the combined beam to deteriorate, resulting in a weak light bearing capacity of the signal beam combiner. At the same time, during the fusing tapering processes, air bubbles are inevitably generated in the inner cladding of the input fiber. When the bubbles are located around the input fiber core, it causes the optical signal to refract, which may seriously cause the attenuation of the optical signal, deteriorate the quality of the optical beam, and affect the total reflection transmission of the optical signal in the input fiber core.

SUMMARY

The purpose of the present disclosure is to overcome the above-mentioned defects and provide a beam combiner for a high-power signal and a manufacturing method for the same.

In order to achieve the above purpose, the specific solution of the present disclosure is provided as follows.

A beam combiner for a high-power signal is provided, including: a plurality of input optical fibers, a beam combination optical fiber and an output optical fiber, the input optical fiber includes an input fiber core and an optical fiber input cladding layer wrapping an outer wall of the input fiber core, the output optical fiber includes an output fiber core and an optical fiber output cladding layer wrapping an outer wall of the output fiber core, a cross section of the optical fiber input cladding layer is fan-shaped or hexagonal and is provided with a groove and/or a protrusion along an axial direction, the plurality of input optical fibers are nested with each other to form the beam combination optical fiber, fiber cores in the beam combination optical fiber are all connected to the output fiber core, and a beam combination cladding layer of the beam combination optical fiber is connected to the output fiber core or the optical fiber output cladding layer.

The optical fiber input cladding layer is provided with the groove and/or the protrusion through etching by means of a laser.

The cross sections of the groove and the protrusion are square or T-shaped.

A method for manufacturing a beam combiner for a high-power signal is provided, including:

at a first step, stripping portions of input coating layers of a plurality of input optical fibers to expose optical fiber input cladding layers of the input optical fibers corresponding to the portions; stripping a portion of an output coating layer of an output optical fiber to expose an optical fiber input cladding layer of the output optical fiber corresponding to the portion;

at a second step, etching the exposed optical fiber input cladding layers by a laser to form etching planes, so that cross sections of the optical fiber input cladding layers corresponding to the portions are fan-shaped or hexagonal and the etching planes are provided with grooves and/or protrusions in an axial direction;

at a third step, nesting and matching the grooves and protrusions on the plurality of input optical fibers with each other to form a beam combination optical fiber;

at a fourth step, truncating an end face of the beam combination optical fiber before connecting the end face to the output optical fiber with the exposed optical fiber output cladding layer, to complete the manufacturing of the beam combiner for the high-power signal.

At the third step, the plurality of input optical fibers are nested and matched with each other through a mechanical clamp.

Advantages

With the structure and method of the present disclosure, there is no need to go through the fusing and tapering or acid rot process, which does not damage the structure of the input fiber core, thereby effectively avoiding the deterioration of the beam quality caused by mode excitation; and no bubble is generated in the optical fiber input cladding layer of the input optical fiber, accordingly the signal is transmitted in the input optical fiber through the total reflection, the signal light bearing capacity is stronger, which is beneficial to the transmission of the high-power signals, and the present disclosure has a simple structure and is easy to manufacture.

In addition, the plurality of input optical fibers are nested with each other to form a beam combination optical fiber, which not only solves the problem of bubbles, but also finds that such arrangement has a better heat dissipation effect in actual use. The reason is that when the groove and the protrusion are matched with each other, there is a very small gap, the air molecules can pass through the gap and form a temperature difference, and accordingly form a certain air flow, which can take away the heat in the beam combination optical fiber.

DESCRIPTION OF REFERENCE SIGNS 10, input optical fiber; 11, input coating layer; 12, optical fiber input cladding layer; 121, groove; 122, protrusion; 13, input fiber core; 20, beam combination optical fiber; 30, output optical fiber; 31, output fiber core; 32, optical fiber output cladding layer; 33, output coating layer.

DETAILED DESCRIPTION

The present disclosure will be described in detail with reference to the accompanying drawings and specific embodiments, which does not limit the scope of implementation of the present disclosure.

Figure 1:
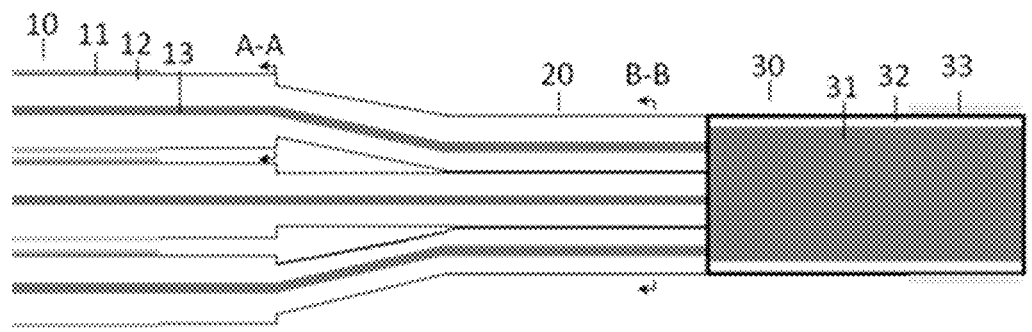
FIG. 1 is a schematic structure diagram according to an embodiment of the present disclosure.
Figure 2:
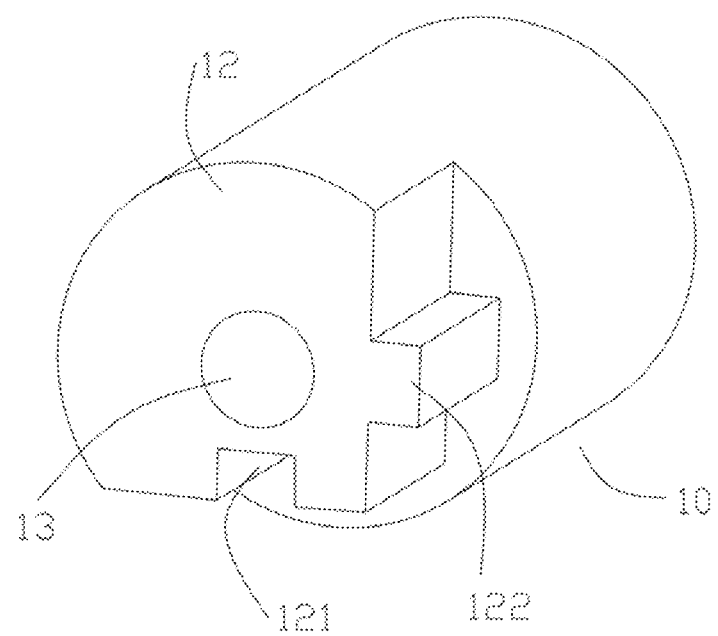
FIG. 2 is a schematic structure diagram of a square groove and a protrusion of an input optical fiber ribbon according to an embodiment of the present disclosure.
Figure 3:
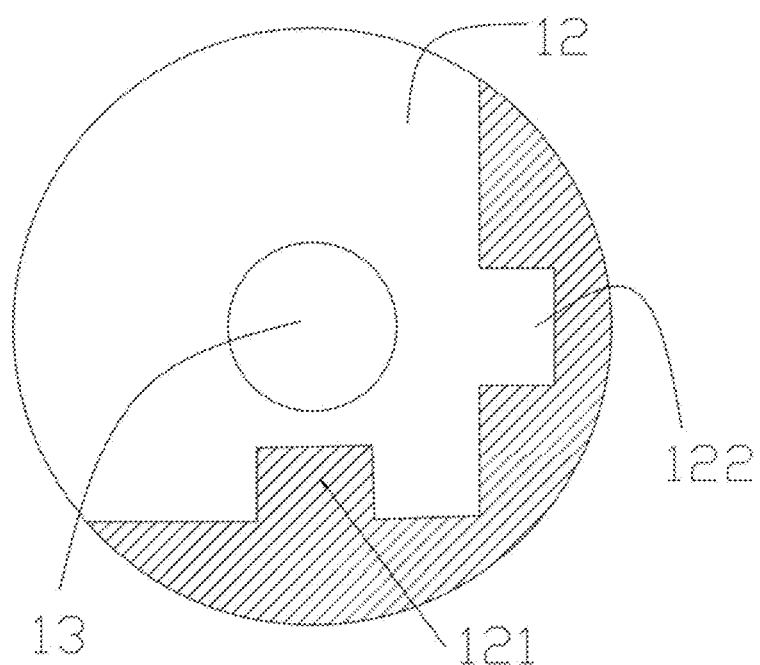
FIG. 3 is a schematic cross-sectional view of the input fiber in FIG. 2 along a line A-A shown in FIG. 1.
Figure 4:
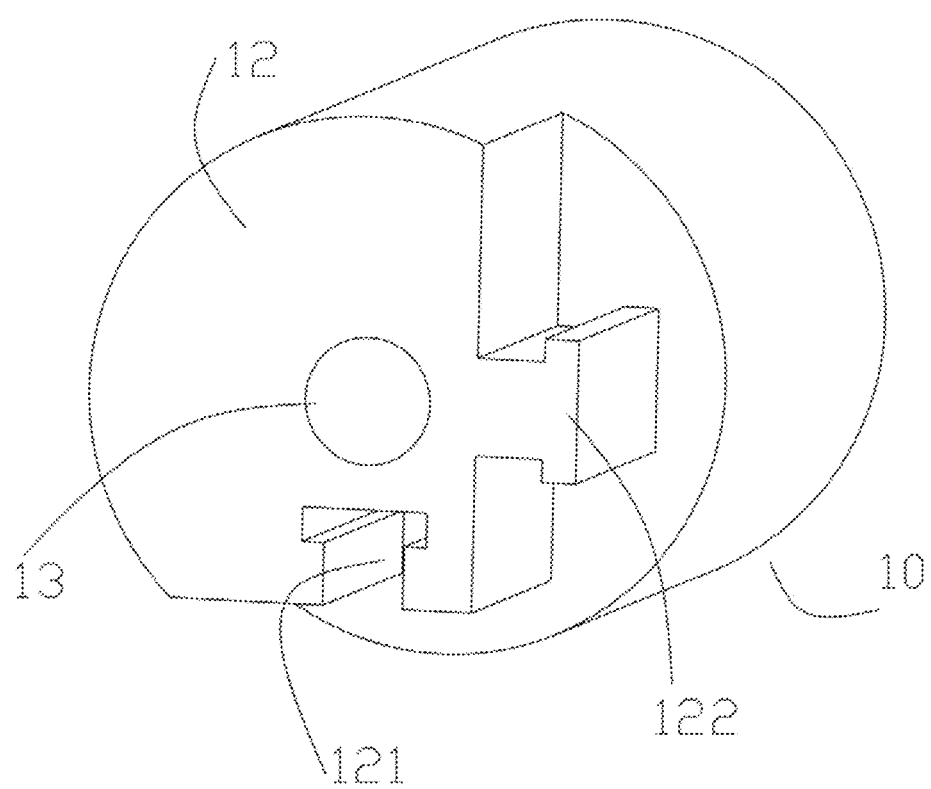
FIG. 4 is a schematic structure diagram of a T-shaped groove and a protrusion of an input optical fiber ribbon according to an embodiment of the present disclosure.
Figure 5:
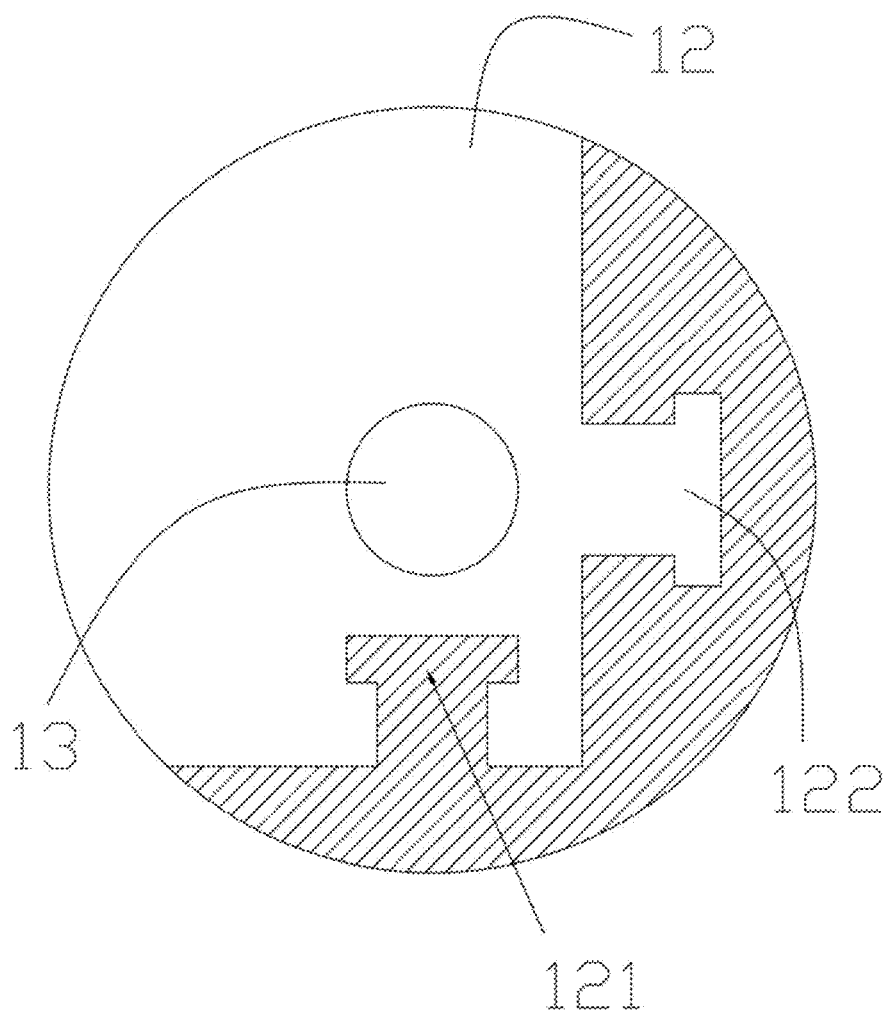
FIG. 5 is a schematic cross-sectional view of the input fiber in FIG. 4 along the line A-A shown in FIG. 1.
Figure 6:
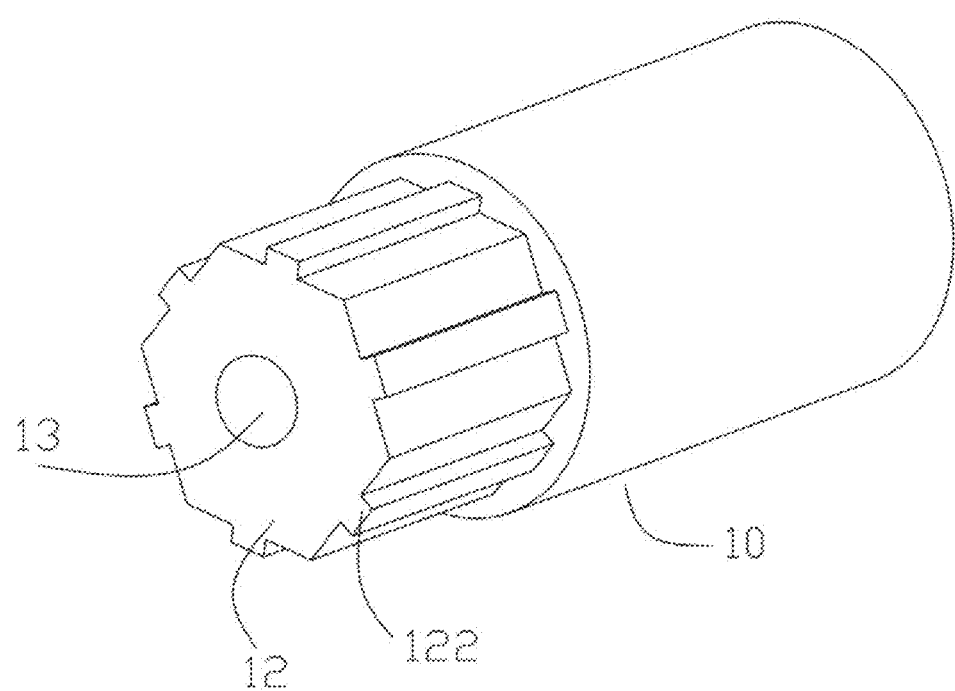
FIG. 6 is a schematic structure diagram of a square protrusion of an input optical fiber ribbon according to another embodiment of the present disclosure.
Figure 7:
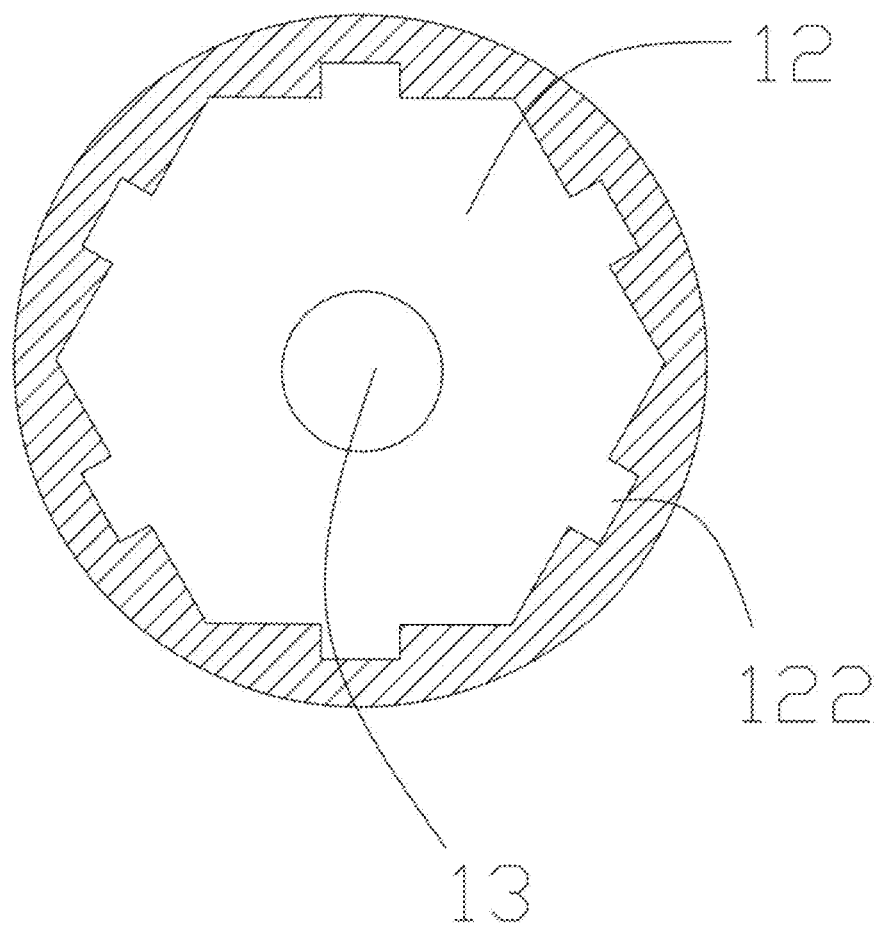
FIG. 7 is a schematic cross-sectional view of the input fiber in FIG. 6.
Figure 8:
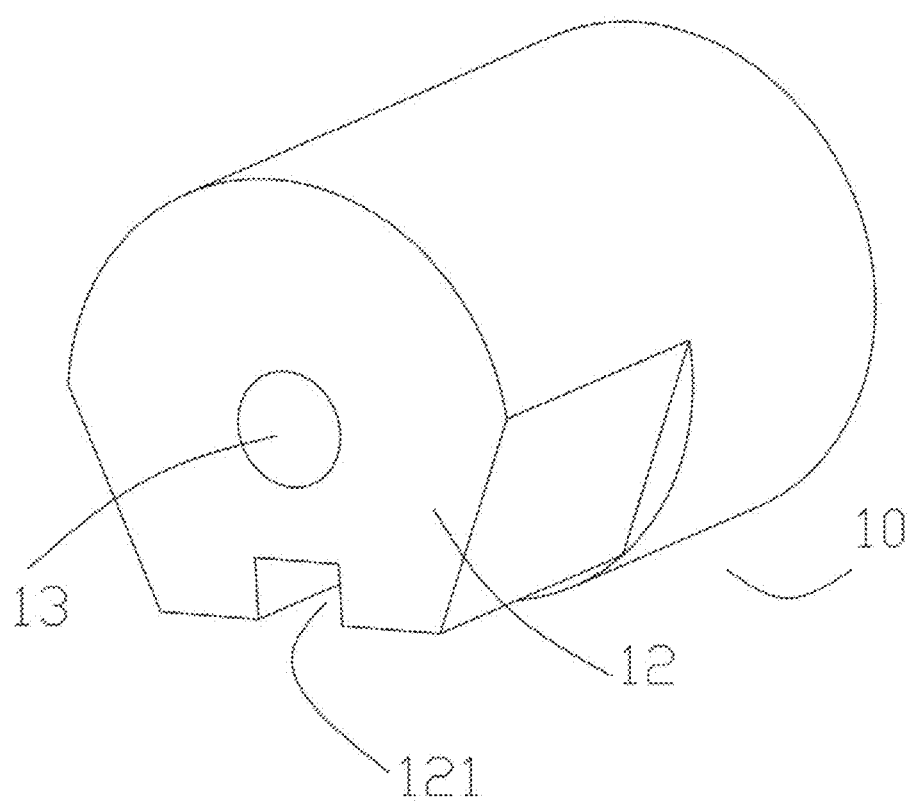
FIG. 8 is a schematic structure diagram of a square groove of an input optical fiber ribbon according to another embodiment of the present disclosure.
Figure 9:
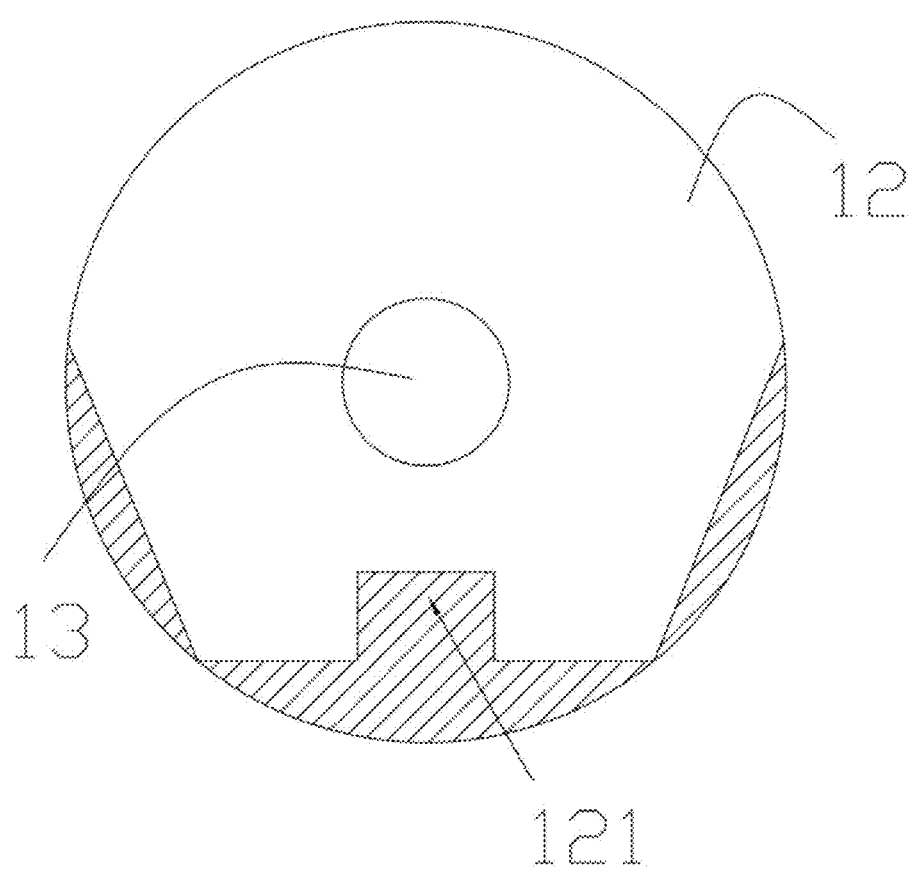
FIG. 9 is a schematic cross-sectional view of the input fiber in FIG. 8 along the line A-A shown in FIG. 1.
Figure 10:
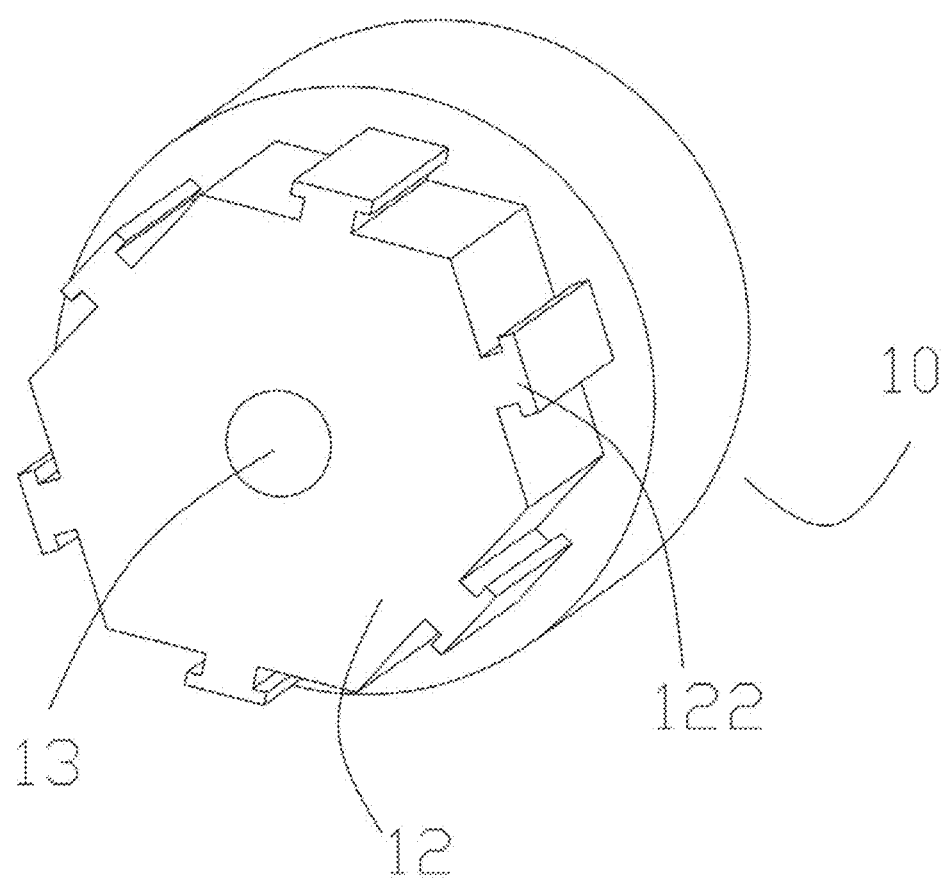
FIG. 10 is a schematic structure diagram of a T-shaped protrusion of an input optical fiber ribbon according to another embodiment of the present disclosure.
Figure 11:
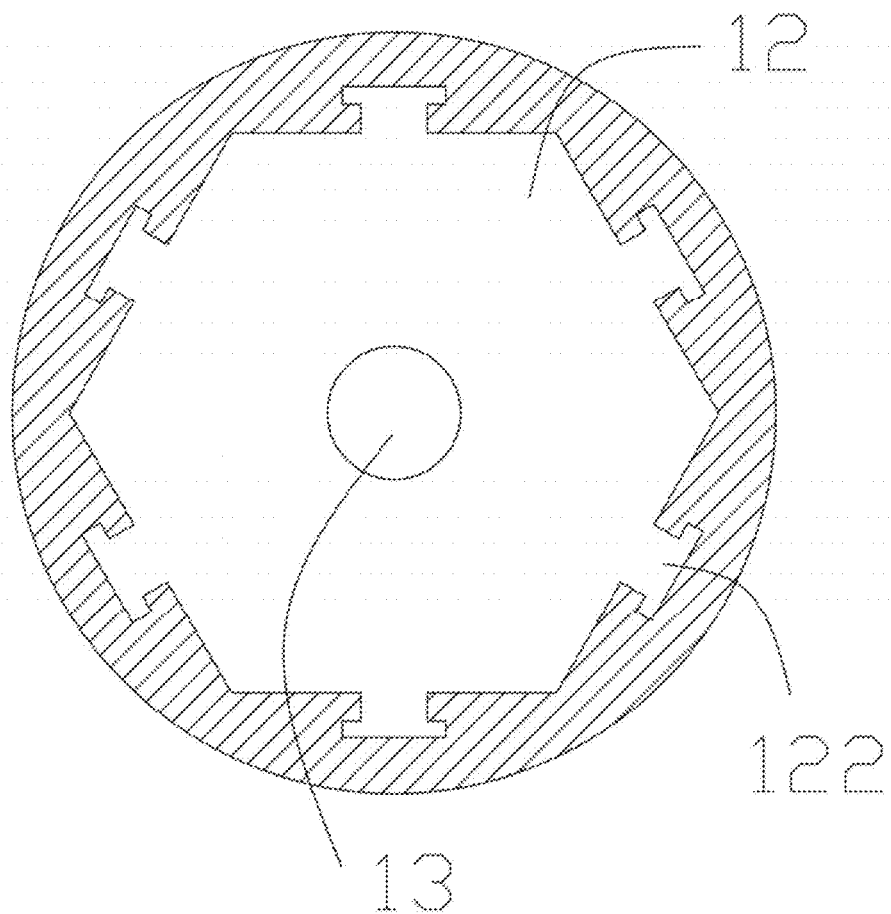
FIG. 11 is a schematic cross-sectional view of the input optical fiber in FIG. 10.
Figure 12:
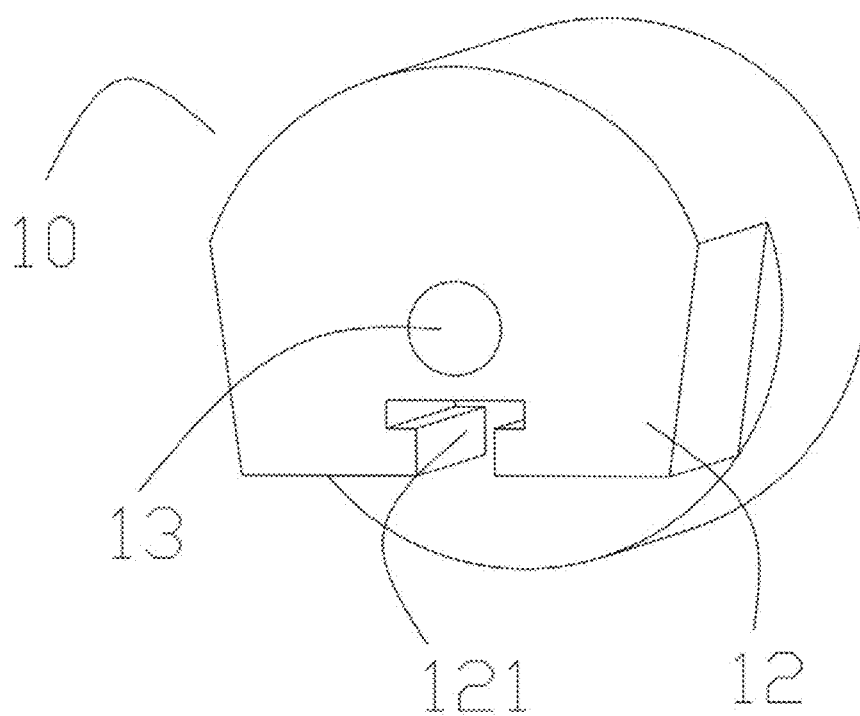
FIG. 12 is a schematic structure diagram of a T-shaped groove of an input optical fiber ribbon according to another embodiment of the present disclosure.
Figure 13:
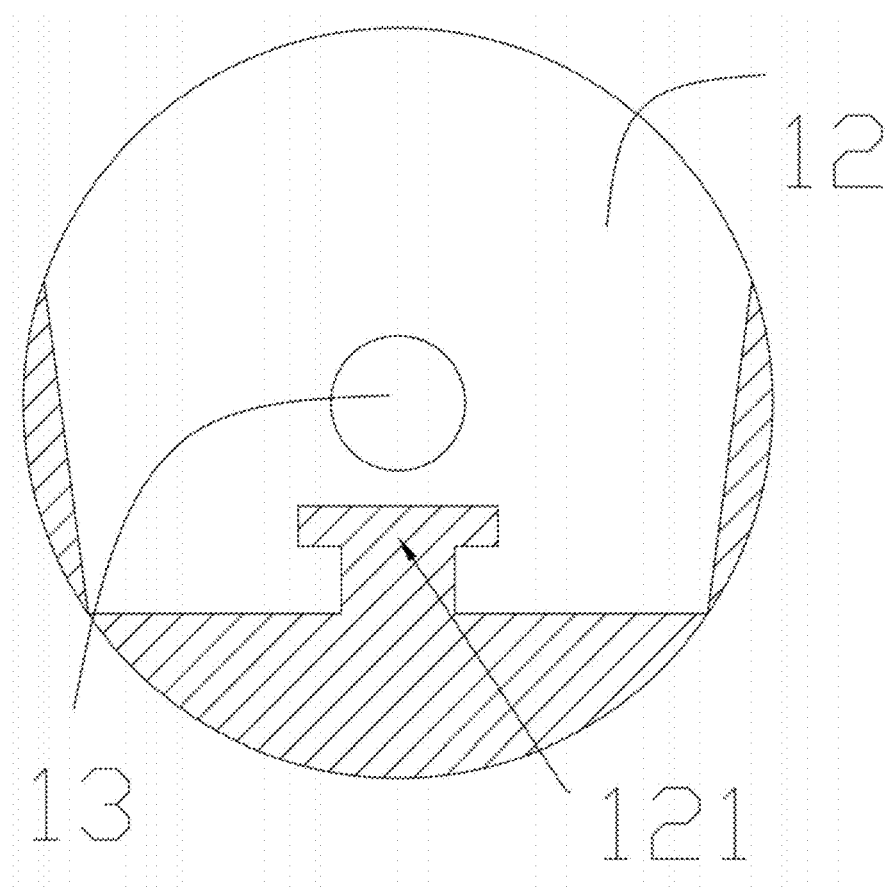
FIG. 13 is a schematic cross-sectional view of the input optical fiber in FIG. 12 along the line A-A shown in FIG. 1.
Figure 14:
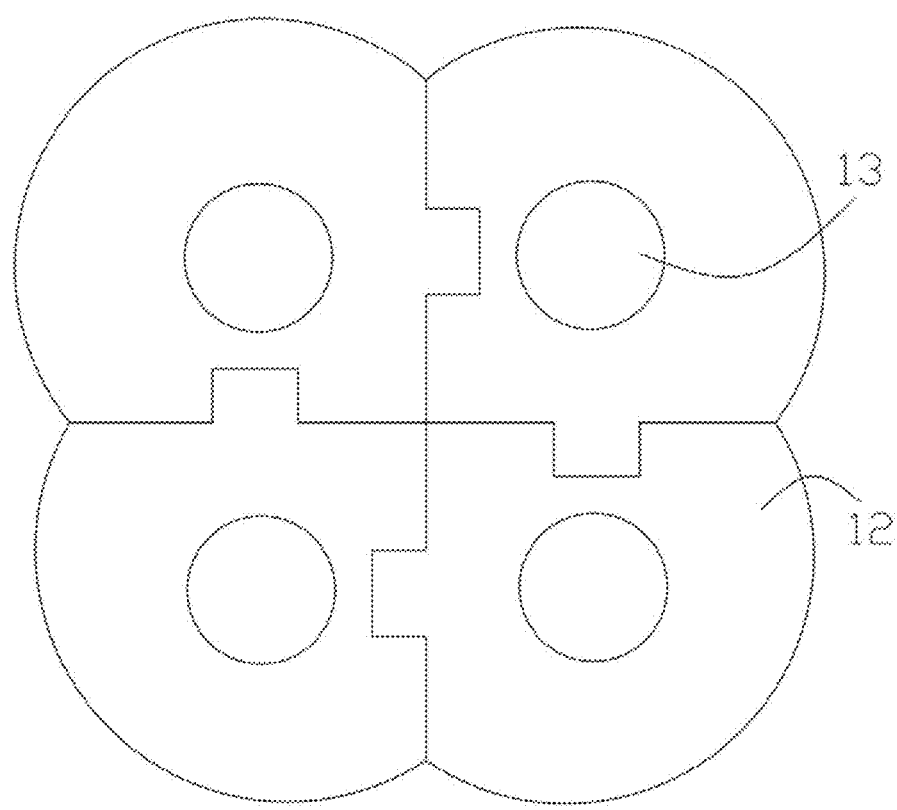
FIG. 14 is a schematic cross-sectional view of a beam combination optical fiber with a square groove and a protrusion along a line B-B shown in FIG. 1 according to an embodiment of the present disclosure.
Figure 15:
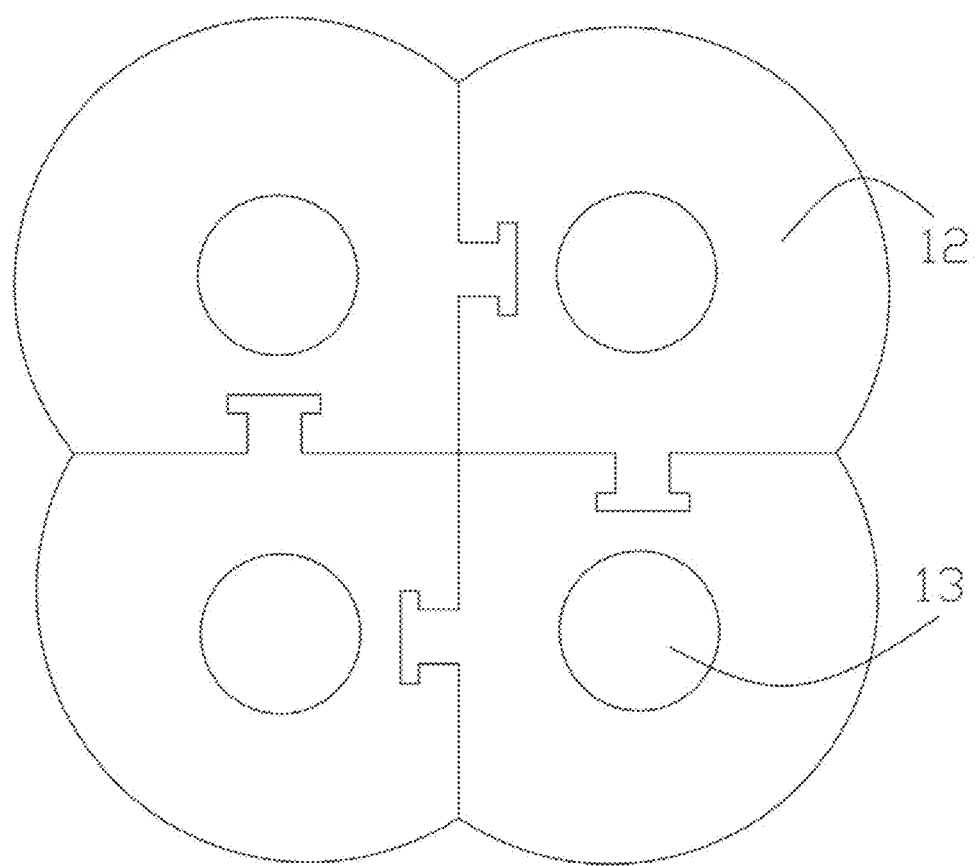
FIG. 15 is a schematic cross-sectional view of a beam combination optical fiber with a T-shaped groove and a protrusion along the line B-B shown in FIG. 1 according to an embodiment of the present disclosure.
Figure 16:
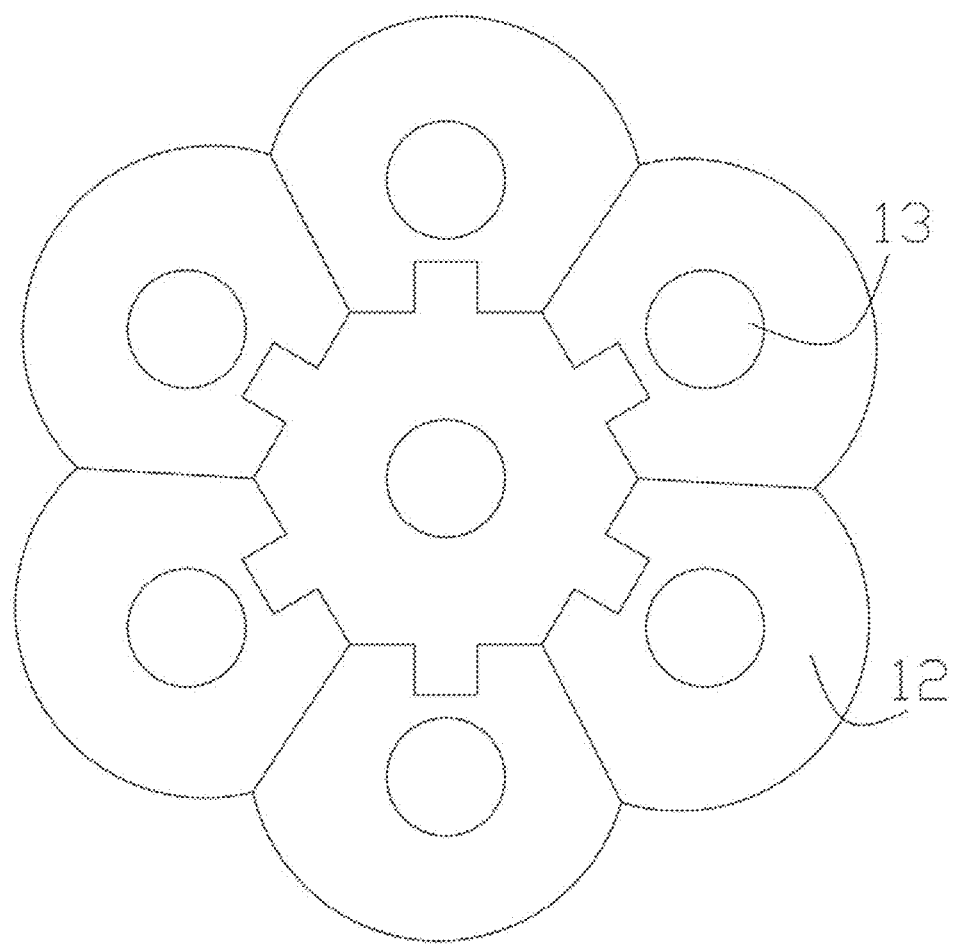
FIG. 16 is a schematic cross-sectional view of a beam combination optical fiber with a square groove and a protrusion along the line B-B shown in FIG. 1 according to another embodiment of the present disclosure.
Figure 17:
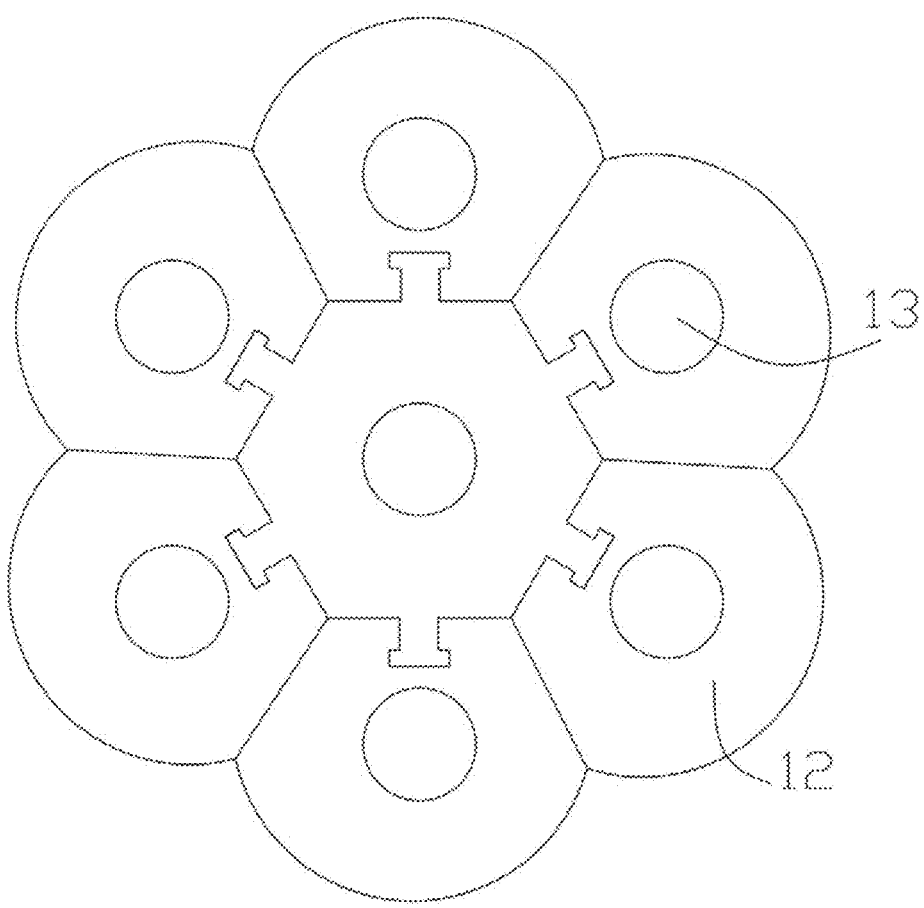
FIG. 17 is a schematic cross-sectional view of a beam combination optical fiber with a T-shaped groove and a protrusion along the line B-B shown in FIG. 1 according to another embodiment of the present disclosure.

As shown in FIGS. 1 to 17, a beam combiner for a high-power signal described in this embodiment includes a plurality of input optical fibers 10, a beam combination optical fiber 20, and an output optical fiber 30. The input optical fiber 10 includes an input fiber core 13 and an optical fiber input cladding layer 12 wrapping an outer wall of the input fiber core 13. The output optical fiber 30 includes an output fiber core 31 and an optical fiber output cladding layer 32 wrapping an outer wall of the output fiber core 31. A cross section of the optical fiber input cladding layer 12 is in a fan shape or a hexagonal shape and is provided with a groove 121 and/or a protrusion 122 along an axial direction. A plurality of input optical fibers 10 are nested with each other to form a beam combination optical fiber 20. The fiber cores in the beam combination optical fiber 20 are all connected to the output fiber core 31, and the beam combination cladding layer of the beam combination optical fiber 20 is connected to the output fiber core 31 or the optical fiber output cladding layer 32. Further, the optical fiber input cladding layer 12 is provided with the groove 121 and/or the protrusion 122 by laser etching. Further, the cross sections of the groove 121 and the protrusion 122 are square or T-shaped.

Specifically, each input optical fiber 10 further includes an input coating layer 11 wrapping the outer wall of the optical fiber input cladding layer 12; and the output optical fiber 30 further includes an output coating layer 33 wrapping the outer wall of the optical fiber output cladding layer 32. The input coating layer 11 on one end of the input optical fiber 10 is stripped, so that the optical fiber input cladding layer 12 of the input optical fiber 10 in this segment is exposed, and the exposed optical fiber input cladding layer 12 is etched by a laser to form an etching plane; at the same time, the cross section of the optical fiber input cladding layer 12 is made fan-shaped or hexagonal, and the etching plane of the optical fiber input cladding layer 12 of each input optical fiber 10 is provided with a square or T-shaped groove 121 and/or a protrusion along the axial direction. The groove 121 and the protrusion 122 are staggered, and then a plurality of fan-shaped input optical fibers 10 are nested with each other to form a beam combination optical fiber 20 through a mechanical clamp; an end face of the beam combination optical fiber 20 is truncated and then fused with the output optical fiber 30 to complete the manufacture of the beam combiner for the high-power signal.

As shown in FIGS. 1 to 5, 14, and 15, furthermore, the number of the input optical fibers 10 is four, that is, a 4×1 signal beam combiner; a diameter of the input coating layer 11 is 550 μm, a diameter of the optical fiber input cladding layer 12 is 400 μm, and a diameter of the input fiber core 13 is 20 μm. The diameter of the output coating layer 33 is 480 μm, the diameter of the optical fiber output cladding layer 32 is 360 μm, and the diameter of the output fiber core 31 is 100 μm; then the exposed optical fiber input cladding layer 12 is etched by the laser to form an etching plane, and the input fiber core 13 is not exposed; at the same time, a square or T-shaped groove 121 and a protrusion 122 are provided on the etching plane; four etched input optical fibers 10 are nested with each other through the matching of the groove 121 and the protrusion 122 to form the beam combination optical fiber 20; and then an end face of the beam combination optical fiber 20 is truncated and then fused with the output optical fiber 30 to complete the manufacture of the beam combiner for the high-power signal.

As shown in FIGS. 1, 6 to 13, 16, and 17, another structure in this embodiment is that the number of the input optical fibers 10 is seven, and the number of input optical fibers 10 is seven, that is, a 7×1 signal beam combiner. The diameter of the input coating layer 11 is 550 μm, the diameter of the optical fiber input cladding layer 12 is 400 μm, the diameter of the input fiber core 13 is 20 μm, the diameter of the output coating layer 33 is 780 μm, and the diameter of the optical fiber output cladding layer 32 is 500

μm, the diameter of the output fiber core 31 is 300 μm; then the exposed optical fiber input cladding layer 12 is etched by the laser to form an etching plane, so that the cross section of the optical fiber input cladding layer 12 of one of the input optical fibers 10 is hexagonal, and the cross section of the optical fiber input cladding layer 12 of the remaining input optical fibers 10 is fan-shaped; and six square or T-shaped protrusions 122 are provided on the etching plane of the input optical fiber 10 with the hexagonal cross section; and square or T-shaped grooves 121 are correspondingly provided on etching planes of the remaining input optical fibers 10, and then the input optical fiber 10 with the hexagonal cross section is arranged at a center position, and the remaining input optical fibers 10 are nested with the input optical fiber 10 with the hexagonal cross section through the matching of the groove 121 and the protrusion 122 to form the beam combination optical fiber 20; and then the end face of the beam combination optical fiber 20 is truncated and then fused with the output optical fiber 30 to complete the manufacture of the beam combiner for the high-power signal.

Apparently, in this embodiment, the beam combination optical fiber 20 can be further fixed by dispensing glue, or the beam combination optical fiber 20 can be sheathed in a hose, a metal tube or a glass tube, so that the beam combination optical fiber 20 has a stronger structure.

With the beam combiner for the high-power signal in this embodiment, there is no need to go through the fusing and tapering or acid rot process, without damaging the structure of the input fiber core 13, which effectively avoids the deterioration of the beam quality caused by the mode excitation. No bubble is generated inside the optical fiber input cladding layer 12 of the input optical fiber 10, which ensures that the signal is transmitted through the total reflection in the input optical fiber 10. Accordingly, the light bearing capacity of the signal is stronger, which is conducive to the transmission of high-power signals; and the structure in this embodiment is simple and easy to manufacture.

In addition, multiple input optical fibers 10 are nested with each other to form the beam combination optical fiber 20, which not only solves the problem of bubbles, but also has a better heat dissipation effect in actual use. The reason is that when the groove 121 is matched with the protrusion 122, there is a very small gap through which air molecules can pass through and form a temperature difference to form a certain air flow, which can take away the heat in the beam combination optical fiber 20.

As shown in FIGS. 1 to 17, a method for manufacturing a beam combiner for a high-power signal includes the following steps.

First step: portions of input coating layers 11 of multiple input optical fibers 10 are stripped, so that optical fiber input cladding layers 12 of the input optical fibers 10 corresponding to the portions are exposed; and a portion of an output coating layer 33 of an output optical fiber 30 is stripped to make an optical fiber input cladding layer 12 of the output optical fiber 30 corresponding to the portion exposed.

Second step: the exposed optical fiber input cladding layer 12 is etched by a laser to form an etching plane, so that a cross section of the optical fiber input cladding layer 12 corresponding to the part is fan-shaped or hexagonal, and the etching plane is provided with a groove 121 and/or a protrusion 122 in an axial direction.

Third step: grooves 121 and protrusions 122 on the multiple input optical fibers 10 are nested and matched with each other to form a combined optical fiber 20.

Fourth step: an end face of the beam combination optical fiber 20 is truncated and then connected to the output optical fiber 30 on which the optical fiber output cladding layer 32 is exposed to complete the manufacture of beam combiner for the high-power signal.

In the manufacturing method of this embodiment, only the optical fiber input cladding layer 12 is etched by the laser, which neither damages the input fiber core 13 nor affects the internal structure of the optical fiber input cladding layer 12, and ensures no bubble generated in the optical fibers 10; at the same time, multiple input optical fibers 10 are nested and matched with each other through a mechanical clamp, which protect the input optical fibers 10 from being damaged by compression.

By using the manufacturing method described in this embodiment, a plurality of input optical fibers 10 are nested with each other through square or T-shaped grooves 121 and protrusions 122 to form a beam combination optical fiber 20 without going through fusing and tapering and acid rot processes, which ensures that the input fiber core 13 is not deformed, thereby avoiding introducing impurities, and avoiding fiber break and mode excitation leading to deterioration of the beam quality; and at the same time, no bubble is generated in the optical fiber input cladding layer 12 to ensure that the signal is transmitted in the input fiber core 13 through the total reflection, which improves the light bearing capacity of the beam combiner for signals, and is conducive to the transmission of the high-power signals.

In addition, the beam combiner for the high-power signal completed by the manufacturing method in this embodiment not only solves the bubble problem, but also has a better heat dissipation effect in actual use. The reason is that when the groove 121 is matched with the protrusion 122, there is a very small gap for air molecules to pass through, and a temperature difference is formed to form a certain air flow to take away the heat in the beam combination optical fiber 20.

The above is only a preferred embodiment of the present disclosure, any equivalent variations or modifications made in accordance with the structure, features and principles described in the scope of the present disclosure are included in the scope of protection of the present disclosure.

What is claimed is:

1. A beam combiner for a high-power signal, comprising: a plurality of input optical fibers, a beam combination optical fiber and an output optical fiber, wherein the input optical fiber comprises an input fiber core and an optical fiber input cladding layer wrapping an outer wall of the input fiber core, the output optical fiber comprises an output fiber core and an optical fiber output cladding layer wrapping an outer wall of the output fiber core, a cross section of the optical fiber input cladding layer is fan-shaped or hexagonal and is provided with a groove and/or a protrusion along an axial direction, the plurality of input optical fibers are nested with each other to form the beam combination optical fiber, fiber cores in the beam combination optical fiber are all connected to the output fiber core, and a beam combination cladding layer of the beam combination optical fiber is connected to the output fiber core or the optical fiber output cladding layer.

2. The beam combiner for the high-power signal according to claim 1, wherein the optical fiber input cladding layer is provided with the groove and/or the protrusion through etching by means of a laser.

3. The beam combiner for the high-power signal according to claim 1, wherein cross sections of the groove and the protrusion are square or T-shaped.

4. The beam combiner for the high-power signal according to claim 2, wherein cross sections of the groove and the protrusion are square or T-shaped.

5. A method for manufacturing a beam combiner for a high-power signal, comprising: at a first step, stripping portions of input coating layers of a plurality of input optical fibers to expose optical fiber input cladding layers of the input optical fibers corresponding to the portions; stripping a portion of an output coating layer of an output optical fiber to expose an optical fiber input cladding layer of the output optical fiber corresponding to the portion; at a second step, etching the exposed optical fiber input cladding layers by a laser to form etching planes, so that cross sections of the optical fiber input cladding layers corresponding to the portions are fan-shaped or hexagonal and the etching planes are provided with grooves and/or protrusions in an axial direction; at a third step, nesting and matching the grooves and protrusions on the plurality of input optical fibers with each other to form a beam combination optical fiber; at a fourth step, truncating an end face of the beam combination optical fiber before connecting the end face to the output optical fiber with the exposed optical fiber output cladding layer, to complete the manufacturing of the beam combiner for the high-power signal.

6. The method for manufacturing the beam combiner for the high-power signal according to claim 5, wherein at the third step, the plurality of input optical fibers are nested and matched with each other through a mechanical clamp.

\* \* \* \* \*